(No Model.)
E. R. IVES.
TOY.
No. 290,185. Patented Dec. 11, 1883.
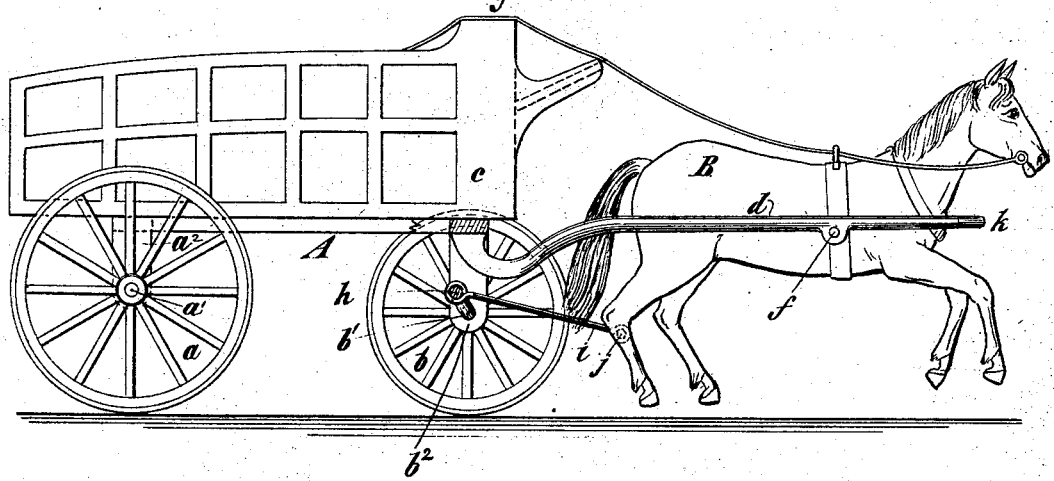
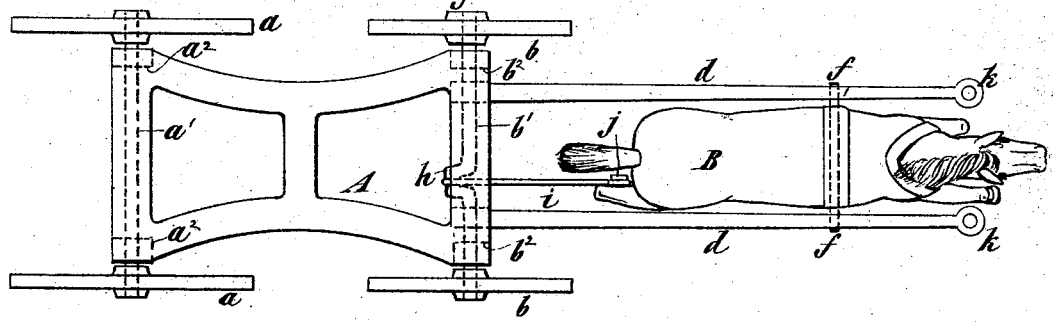
Witnesses
James R. Bowen.
C. F. Sundgren.
Inventor
Edward R. Ives,
by his attorney,
Edwin H. Brown

UNITED STATES PATENT OFFICE.

EDWARD R. IVES, OF BRIDGEPORT, CONNECTICUT, ASSIGNOR TO HIMSELF, AND CORNELIUS BLAKESLEE AND EDWARD G. WILLIAMS, BOTH OF BROOKLYN, NEW YORK.

TOY.

SPECIFICATION forming part of Letters Patent No. 290,185, dated December 11, 1883.

Application filed August 8, 1883. (No model.)

*To all whom it may concern:*

Be it known that I, EDWARD R. IVES, of Bridgeport, in the county of Fairfield and State of Connecticut, have invented a certain new and useful Improvement in Toys, of which the following is a specification.

My improvement relates to toys, consisting of vehicles having horses or other animals arranged in front of the same, so as to have the appearance of drawing them.

The object of the improvement is to provide a simple means whereby a galloping or rocking motion may be imparted to the animal or animals of such a toy.

To this end my improvement consists in the combination, with a wheeled vehicle, of shaft or a pole so connected with the vehicle that they or it will be supported against downward movement solely by the vehicle, an animal or animals pivotally connected with the shafts or pole, so as to be supported thereby, an axle or shaft which will derive a rotary motion from wheels forming part of the vehicle as said wheels roll over the ground, and provided with a crank or equivalent device, and a connection between said crank or equivalent device and the rear portion of the animal or animals, whereby the vehicle, being made the sole support of the shafts or pole, serves to support the animal or animals, and also to transmit a rocking motion to the animal or animals.

In the accompanying drawings, Figure 1 is a side view of a toy embodying my improvement; and Fig. 2 is a plan of the same with certain parts omitted, the better to exhibit my improvement.

Similar letters of reference designate corresponding parts in both figures.

A designates a wheeled vehicle. It may be made of any desired material and style. The rear wheels, $a$, may be fixed or loose upon their axle $a'$, but the front wheels, $b$, are to be rigidly affixed to their axle $b'$, and the latter rotates with them. The axles $a'$ and $b'$ fit in bearers $a^2$ $b^2$, extending from the body $c$ of the vehicle, and are thus connected to the latter. Shafts $d$ extend from the front of the vehicle. As shown, they are rigidly connected to the body of the vehicle. They may be cast integral with the bottom of the body of the vehicle, if desirable. If preferred, they may be connected to the body of the vehicle by a knuckle-joint, so that they may be swung upward but not downward beyond a certain point. They may also be detachably secured to the body of the vehicle. In any case the shafts are to be rigidly connected with the vehicle-body to such an extent that they cannot be swung or moved downwardly below a certain point, and in such manner that they will be supported against downward movement solely by the vehicle.

B designates a horse. It may be made of iron, and cast in two longitudinal halves, riveted or otherwise secured together. Any other animal may be substituted for the horse, if desirable. The horse is pivoted at about the middle of its length to the shafts. As here shown, it has a rod, $f$, extending through holes in the horse and into holes in the shafts; but pivots may be formed in any other suitable manner. The horse is supported by the shafts above the plane of the bottoms of the wheels of the vehicle, and hence when the vehicle is placed on any flat surface the horse will be supported above that surface. Owing to this and the pivotal connection between the horse and the shafts the horse can have a galloping or rocking motion imparted to it.

The axle or shaft $b'$ of the front wheels, $b$, has a crank, $h$. A rod, $i$, is fastened to this crank $h$, and to a wrist, $j$, extending from one of the hind legs of the horse. As the front wheels rotate, they impart a rotary motion to the axle or shaft $b'$, and the rod $i$ transmits from the crank $h$ a galloping or rocking movement to the horse.

In lieu of providing the axle or shaft $b'$ with a crank, I may employ another shaft geared to the axle or shaft $b'$, so as to derive motion therefrom and provide this additional shaft with a crank connected by a rod to the horse. In any case an eccentric or a cam may be used in lieu of a crank, to impart a galloping or rocking motion to the horse.

Two horses or other animals may be pivoted to a pole connected to the body of the vehicle like the shafts, and may have a galloping or rocking movement imparted to them, in the manner described.

The toy may be drawn over the ground or any suitable surface by a cord fastened to eyes *k* on the shafts, or to an eye on a pole. It will be seen that by my improvement I provide very simple means, whereby a galloping or rocking movement may be imparted to an animal or animals from the wheels of a vehicle which supports the animal or animals.

What I claim as my invention, and desire to secure by Letters Patent, is—

The combination, with a wheeled vehicle, of shafts or a pole so connected with the vehicle that they or it will be supported against downward movement solely by the vehicle, an animal or animals pivotally connected with the shafts or pole, so as to be supported thereby, an axle or shaft which will derive a rotary motion from wheels forming part of the vehicle as said wheels roll over the ground, and provided with a crank or equivalent device, and a connection between said crank or device and the rear portion of the animal or animals, substantially as specified, whereby the vehicle, being made the sole support of the shafts or pole, serves to support the animal or animals, and also to transmit a rocking motion to the animal or animals.

EDWARD R. IVES.

Witnesses:
 DWIGHT H. TERRY,
 W. F. BISHOP.